United States Patent
Doumoto et al.

(10) Patent No.: US 6,884,455 B2
(45) Date of Patent: Apr. 26, 2005

(54) PROCESS FOR PRODUCING FERMENTED FISH FOOD

(75) Inventors: Nobuhiko Doumoto, Hachioji (JP); Takashi Mori, Hachioji (JP); Masayuki Nasu, Hachioji (JP)

(73) Assignee: Nippon Suisan Kaisha, Ltd., Tokyo (JP)

( * ) Notice: Subject to any disclaimer, the term of this patent is extended or adjusted under 35 U.S.C. 154(b) by 0 days.

(21) Appl. No.: 10/485,860

(22) PCT Filed: Aug. 5, 2002

(86) PCT No.: PCT/JP02/07951

§ 371 (c)(1),
(2), (4) Date: Feb. 4, 2004

(87) PCT Pub. No.: WO03/013281

PCT Pub. Date: Feb. 20, 2003

(65) Prior Publication Data

US 2004/0185164 A1 Sep. 23, 2004

(30) Foreign Application Priority Data

Aug. 6, 2001 (JP) .................................. 2001-238004

(51) Int. Cl.$^7$ .............................. A23L 1/325; A23B 4/22
(52) U.S. Cl. ......................................... 426/643; 426/56
(58) Field of Search ........................... 426/55, 56, 574, 426/643, 7

(56) References Cited

U.S. PATENT DOCUMENTS

| | | | |
|---|---|---|---|
| 3,937,814 A | * | 2/1976 | Nickerson et al. ........ 424/93.45 |
| 4,041,181 A | * | 8/1977 | Burrows et al. ............... 426/55 |
| 5,849,289 A | * | 12/1998 | Dobrogosz et al. ....... 424/93.45 |
| 6,572,883 B1 | * | 6/2003 | Eriksson ..................... 424/451 |
| 2004/0208978 A1 | * | 10/2004 | Jiang et al. .................. 426/643 |

FOREIGN PATENT DOCUMENTS

| | | | |
|---|---|---|---|
| CA | 2294664 | 7/2000 | |
| EP | 0 784 939 | 7/1997 | |
| JP | 54-105270 | 8/1979 | |
| JP | 61-35765 | 2/1986 | |
| JP | 02-2315 | 1/1990 | |
| JP | 03-280862 | 12/1991 | |
| JP | 5-308895 | * 11/1993 | ........... A23B/4/023 |
| JP | 7-16079 | 1/1995 | |
| JP | 7-67587 | 3/1995 | |
| JP | 07-135927 | 5/1995 | |
| JP | 8-116928 | 5/1996 | |
| JP | 09-313133 | 9/1997 | |
| WO | WO 02/45518 | 11/2001 | |

OTHER PUBLICATIONS

Takeo Kato et al., *Isolation of Psychrotrophic Lactic Acid Bacteria, and its Application for Fermented Meat Products*, Journal of the Japanese Society for Food Science and Technology, vol. 41, No. 2, pp. 108–115, 1994 Full English translation.

Seiichi Haga et al., *Effects of Curing and Fermenting Time on the Quality of Hams Fermented with Psychrotrophic Lactic Acid Bacteria*, Journal of the Japanese Society for Food Science and Technology, vol. 41, No. 11, pp. 797–802, 1994 Full English translation.

Hwang, JW. et al., *Preparation of Fermented Sausages from Underutilized Fish and Meat Sources*, J. Food Process. Preserv., vol. 13, No. 3, pp. 187–200, 1989.

P. Reece, *The Role of Oxygen in the Production of Formaldehyde in Frozen Minced Cod Muscle*, J. Sci. Food. Agric. 1983, 34, pp. 1108–1112.

G. Boer et al., *Effect of Mixing and Moisture Modification on Toughening and Dimethylamine Formation in Alaska Pollock Mince during Frozen Strate at −10°C*, Journal of Food Science, vol. 54, No. 6, pp. 1524–1529, 1989.

Y. Kudoh et al., *Antioxidative Peptide from Milk Fermented with Lactobacillus delbrueckii subsp. bulgaricus IFO13953*, Nippon Shokuhin Kagaku Kogaku Kaishi, vol. 48, No. 1, pp. 44–50, 2001.

* cited by examiner

Primary Examiner—Keith Hendricks
(74) Attorney, Agent, or Firm—Westerman, Hattori, Daniels & Adrian, LLP

(57) ABSTRACT

Fermented fish-meat food is provided which uses fish meat as start materials, has specific taste and flavor imparted upon fermentation with lactic acid bacteria, and has a texture similar to that of animal meat. In a method for producing a processed seafood product, a lactic acid bacteria fermenting at temperature not higher than 10° C. and having salt tolerance and an antibacterial property is used in the step of fermenting fish and shellfish with lactic acid bacteria. The lactic acid bacteria fermenting at temperature not higher than 10° C. and having salt tolerance and an antibacterial property is a lactic acid bacteria belonging to one genus selected from a group consisting of *Leuconostoc* genus, *Lactobacillus* genus, *Lactococcus* genus, and *Pediococcus* genus. The lactic acid bacteria belonging to *Leuconostoc* genus is a lactic acid bacteria belonging to *Lactobacillus sake* and preferably *Lactobacillus sake* D-1001 (No. 11708 deposition to International Patent Organism Depositary). A method for producing the processed seafood product comprises the steps of fermenting fish and shellfish at temperature not higher than 10° C., followed by smoking and drying the fermented fish and shellfish. A processed seafood product produced by the above-mentioned method is also provided.

9 Claims, No Drawings

PROCESS FOR PRODUCING FERMENTED FISH FOOD

This application is a 371 of PCT/JP02/07951, filed Aug. 05, 2002.

BACKGROUND OF THE INVENTION

1. Field of the Invention

The present invention relates to a method for producing a processed seafood product using fish and shellfish as start materials, and to a processed seafood product produced by the method. More particularly, the present invention relates to a method for producing a processed seafood product using a lactic acid bacteria, and to a processed seafood product produced by the method.

2. Description of the Related Art

Hitherto, when producing ham and sausage from animal meat and fish meat, the meat has been preserved in salt for a substantial long time with a solution containing salt, potassium nitrate, etc. in order to prevent microorganism contamination. In the case of matured ham, for example, a period of one month to a half year has been required for preservation in salt and maturing. Therefore, salt contained in a final product has been considerably high.

Fermented seafood obtained based on the action of microorganisms upon fish and shellfish has been known from old times as represented by *funazushi* (fermented sushi with carp meat) and izushi (fermented sushi), and has still now popularity among people as a local traditional specialty. Such traditional food has been produced as a result of the action of microorganisms, e.g., a lactic acid bacteria, under environments provided using tubs, warehouses, etc., and has not been positively subjected to the action of selected microorganisms. On the other hand, several efforts have been recently made to positively act microorganisms upon food materials and to utilize the resulting effect. For example, *Lactobacillus plantrum* and *Lactobacillus casei* are used for surimi (fish paste) of fish and shellfish (Japanese Patent Laid-Open No. 3-280862). As another example, a lactic acid bacteria starter is used for surimi of salmon and scallop adductor muscle (Japanese Patent Laid-Open No. 7-16079 and No. 8-116928). Those examples are primarily intended to improve quality of surimi, i.e., to obtain physical properties excellent in both gel strength and resilience. Also, those examples are intended to utilize a lactic acid bacteria as a means for producing conventional gelation food such as kamaboko.

SUMMARY OF THE INVENTION

In view of the state of the art that a period of one month to a half year has been required to produce conventional matured ham and sausage of animal meat, it is an object of the present invention to provide novel fermented fish-meat food, which uses fish meat as start materials, has specific taste and flavor imparted upon fermentation with lactic acid bacteria, and has a texture similar to that of animal meat.

To achieve the above object, according to one aspect, the present invention resides in a method for producing a processed seafood product, wherein a lactic acid bacteria fermenting at temperature not higher than 10° C. and having salt tolerance and an antibacterial property is used in the step of fermenting fish and shellfish with lactic acid bacteria.

Preferably, the lactic acid bacteria fermenting at temperature not higher than 10° C. and having salt tolerance and an antibacterial property is a lactic acid bacteria belonging to one genus selected from a group consisting of *Leuconostoc* genus, *Lactobacillus* genus, *Lactococcus* genus, and *Pediococcus* genus. Thus, the present invention resides in a method for producing a processed seafood product, wherein as the lactic acid bacteria fermenting at temperature not higher than 10° C. and having salt tolerance and an antibacterial property, a lactic acid bacteria belonging to one genus selected from a group consisting of *Leuconostoc* genus, *Lactobacillus* genus, *Lactococcus* genus, and *Pediococcus* genus is used in the step of fermenting fish and shellfish with lactic acid bacteria.

Preferably, the lactic acid bacteria belonging to the *Lactobacillus* genus is a lactic acid bacteria belonging to *Lactobacillus* sake. Thus, the present invention resides in a method for producing a processed seafood product, wherein as the lactic acid bacteria fermenting at temperature not higher than 10° C. and having salt tolerance and an antibacterial property, a lactic acid bacteria belonging to *Lactobacillus* sake is used in the step of fermenting fish and shellfish with lactic acid bacteria.

Preferably, the lactic acid bacteria belonging to *Lactobacillus* sake is *Lactobacillus* sake D-1001 (No. 11708 deposition to International Patent Organism Depositary). Thus, the present invention resides in a method for producing a processed seafood product, wherein as the lactic acid bacteria fermenting at temperature not higher than 10° C. and having salt tolerance and an antibacterial property, *Lactobacillus* sake D-1001 (No. 11708 deposition to International Patent Organism Depositary) is used in the step of fermenting fish and shellfish with lactic acid bacteria.

Further, in the method for producing a processed seafood product as defined above, the present invention is featured in comprising the steps of fermenting fish and shellfish at temperature not higher than 10° C., followed by smoking and drying the fermented fish and shellfish. Thus, the present invention resides in a method for producing a processed seafood product, the method comprising the process of fermentation of fish and/or shellfish with a lactic acid bacteria fermenting at temperature not higher than 10° C. and having salt tolerance and an antibacterial property, and the process of smoking and drying the fermented fish and shellfish, the lactic acid bacteria is belonging to one genus selected from a group consisting of *Leuconostoc* genus, *Lactobacillus* genus, *Lactococcus* genus, and *Pediococcus* genus, the lactic acid bacteria being preferably a lactic acid bacteria belonging to *Lactobacillus* sake and more preferably *Lactobacillus* sake D-1001 (No. 11708 deposition to International Patent Organism Depositary).

Further, in the method for producing a processed seafood product as defined above, the present invention is featured in further comprising the process of treatment fish and/or shellfish with salt before, simultaneously, or after the fermentation. Thus, the present invention resides in a method for producing a processed seafood product comprising the process of treatment fish and/or shellfish with salt before, simultaneously, or after the fermentation, the process of fermentation of fish and/or shellfish at temperature not higher than 10° C. using a lactic acid bacteria which has an activity at not higher than 10° C., salt tolerance and an antibacterial property, and preferably the process of smoking and drying the fermented fish and shellfish, the lactic acid bacteria belonging to one genus selected from a group consisting of *Leuconostoc* genus, *Lactobacillus* genus, *Lactococcus* genus, and *Pediococcus* genus, the lactic acid bacteria being preferably a lactic acid bacteria belonging to *Lactobacillus* sake and more preferably *Lactobacillus* sake D-1001 (No. 11708 deposition to International Patent Organism Depositary).

Further, in the method for producing a processed seafood product as defined above, the present invention is featured in further comprising the process of the cooking process of the fermented fish and/or shellfish. Thus, the present invention resides in a method for producing a processed seafood product, comprising the steps of fermenting fish and shellfish at temperature not higher than 10° C. using a lactic acid bacteria fermenting at temperature not higher than 10° C. and having salt tolerance and an antibacterial property, the process of the cooking process of the fermented fish and/or shellfish, and preferably the process of treatment fish and/or shellfish with salt before, simultaneously, or after the fermentation, followed by smoking and drying the fermented fish and shellfish, the lactic acid bacteria is belonging to one genus selected from a group consisting of *Leuconostoc* genus, *Lactobacillus* genus, *Lactococcus* genus, and *Pediococcus* genus, the lactic acid bacteria being preferably a lactic acid bacteria belonging to *Lactobacillus* sake and more preferably *Lactobacillus* sake D-1001 (No. 11708 deposition to International Patent Organism Depositary).

Further, in the method for producing a processed seafood product as defined above, the present invention is featured in using fish meat and/or shellfish meat or minced thereof as a raw material. Thus, the present invention resides in a method for producing a processed seafood product, the method comprising the steps of fermenting fish and/or shellfish meat or minced thereof at temperature not higher than 10° C. using a lactic acid bacteria fermenting at temperature not higher than 10° C. and having salt tolerance and an antibacterial property, preferably followed by the cooking the fermented fish and/or shellfish meat, and smoking and drying the fermented fish and shellfish meat, the lactic acid bacteria is belonging to one genus selected from a group consisting of *Leuconostoc* genus, *Lactobacillus* genus, *Lactococcus* genus, and *Pediococcus* genus, the lactic acid bacteria being preferably a lactic acid bacteria belonging to *Lactobacillus* sake and more preferably *Lactobacillus* sake D-1001 (No. 11708 deposition to International Patent Organism Depositary).

Further, according to another aspect, the present invention resides in a processed seafood product produced by any of the methods of the present invention defined above.

DESCRIPTION OF THE PREFERRED EMBODIMENTS

Fermented fish-meat food, which has taste and flavor specific to fermentation with lactic acid bacteria and has a texture similar to that of animal meat, is obtained through the steps of using a lactic acid bacteria having salt tolerance and an antibacterial property and growing at low temperature; mixing fish and shellfish as start materials with salt and the lactic acid bacteria which has been cultivated and proliferated in advance; fermenting the fish and shellfish at temperature not higher than 10° C. with fermentation; and smoking and then drying the fermented fish and shellfish while controlling temperature and humidity.

In the present invention, since seafood is used as start materials and it is spoiled faster than animal meat, off-flavor and off-taste may possibly occur unless the start materials are kept at low temperature. It is therefore essential that the product of the present invention be produced at low temperature. Accordingly, the lactic acid bacteria used in the present invention is desirably a low-temperature lactic acid bacteria capable of growing at low temperature. To which genus the lactic acid bacteria should belong is not of problem so long as it is a low-temperature lactic acid bacteria. More specifically, a lactic acid bacteria belonging to any of *Leuconostoc* genus, *Lactobacillus* genus, *Lactococcus* genus, *Pediococcus* genus, and so on is usable. Among those genera, *Lactobacillus* sake is preferable which provides a relatively low acid producing power, has salt tolerance and an antibacterial property, and is a low-temperature lactic acid bacteria. Also, the lactic acid bacteria used can be obtained by separating it from foods containing microorganisms belonging to the above-mentioned genera.

For the purpose of preventing generation of off-flavor upon spoilage and oxidation caused by microorganism contamination while enhancing taste and flavor, the lactic acid bacteria used is preferably *Lactobacillus* sake having salt tolerance and an antibacterial property and being able to grow at low temperature, more preferably *Lactobacillus* sake D-1001 (No. 11708 deposition to International Patent Organism Depositary).

The *Lactobacillus* sake D-1001 (No. 11708 deposition to International Patent Organism Depositary) has mycological characters given below.

(1) Gram negative, nonsporing, and facultative anaerobic rods.
(2) It generates DL-lactic acid from glucose, and does not generate gas.
(3) It does not grow at 0° C., but grows at 1, 5, 10, 20 and 37° C. Mobility is negative.
(4) It generates acids from glucose, maltose, mannose, fructose, galactose, sucrose, cellobiose, lactose, dextrin, gluconate, salicin, trehalose, melibiose, and ribose. It does not generate acids from xylose, sorbitol, sorbose, manitol, melezitose, raffinose, and rhamnose.

Fish and shellfish used in the present invention as start materials for producing fermented seafood may be any kind of fish and shellfish such as hoki, salmon, horse mackerel, tuna, bonito, cod, squid, octopus, prawn and shrimp, and krill.

Salt, auxiliary materials, and a lactic acid bacteria which has been cultivated and proliferated in advance, were mixed in the fish and shellfish, and a mixed material is held at temperature not higher than 10° C. Then, the mixed material is smoked and dried. During a maturing period, as fermentation with lactic acid bacteria progresses, the mixed material is slowly dried, whereby fermented fish-meat food is obtained which has taste and flavor specific to the fermentation with lactic acid bacteria and has a texture similar to that of animal meat.

As mentioned above, the fermented seafood of the present invention is produced by mixing a previously cultivated lactic acid bacteria in fish and shellfish together with salt, fermenting the fish and shellfish with lactic acid bacteria, and subjecting the fermented fish and shellfish to a drying and maturing step. To maintain a good fermentation state and high quality, the number of general various germs is preferably not more than $10^3$/g.

More specifically, the fermented seafood of the present invention is generally produced as follows. Fish and shellfish as start materials may be raw or frozen, but it is preferable to handle the fish and shellfish with due care for preventing microorganism contamination to the utmost. Edible parts of the fish and shellfish as start materials are used as they are or in the form of mince. The lactic acid bacteria used is cultivated so as to amount to the number of about $10^9$/g in advance. The lactic acid bacteria, salt and auxiliary materials are mixed together. When the fish and shellfish is in the form of mince, a mixture is directly mixed in the fish and shellfish. When the fish and shellfish is in the form of fillet, the mixture is added to the fish meat by injection using a syringe or by soaking. After casing the fish and shellfish, it is put in a shallow container with good gas permeability and then fermented for one to two weeks at temperature not higher than 10° C. and humidity of 40% to 95%. Holding the temperature to be not higher than 10° C. has technical means of preventing reproduction of various germs, adjusting the fermentation, and maintaining the proper temperature.

After the above process of fermentation with lactic acid bacteria, the fermented fish and shellfish is smoked under the low temperature and dried while controlling temperature and humidity, or, is smoked under high temperature of about 70° C. and sterilized under about 80° C. This smoking and drying step is not limited to a particular one, and can be performed in a usual manner. The fermented food obtained after the smoking and drying step has taste and flavor specific to the fermentation with lactic acid bacteria, has unique umami taste and body specific to fish and shellfish, and exhibits a texture similar to that of animal meat. The thus-obtained fermented food is superior in preservation because of the presence of antibacterial substances produced by the lactic acid bacteria, and can be stored at room temperature or in a chilled or frozen state depending on the degree of drying and water activity of the food.

The processed seafood product treated with salt of the invention is a salt-sprinkled or a salt-soaked fish like Shiozake (salted salmon), or flakes of thereof. The fermented salt-treated seafood of the present invention is generally produced as follows. Fish and shellfish as start materials may be raw or frozen, but it is used after thawing. Fish filleted into two pieces was soaked in the solution of salt, glucose and lactic acid bacteria at 10° C. for four days. After draining water off, the fish was steam boiled for 15 minutes (till the center of the fish became higher than 80° C.). The lactic acid bacteria used is cultivated so as to amount to the number of about $10^9$/g in advance. Then the fish was quick-cooled, flaked into small pieces and vacuum-packed.

The fermented fish or shellfish meat obtains the superior character, such as antibacterial character derived from lactic acid bacteria, the water holding capacity by lactic acid, softness from the acidic protease and so on. Especially, texture of fish meat treated with salt tend to become hard, therefore the soften effect of fermentation with lactic acid bacteria is favorable with salt treated product.

In the fermented seafood of the present invention, for preventing microorganism contamination and enhancing taste and flavor, it is important to use *Lactobacillus* sake D-1001 (No. 11708 deposition to International Patent Organism Depositary) which has salt tolerance and an antibacterial property and is a lactic acid bacteria capable of growing at low temperature, and to use fish and shellfish as main start materials. Further, by carrying out the step of lactic fermentation using the selected lactic acid bacteria and the smoking and drying step under control of temperature and humidity, the fish and shellfish is slowly dried as the fermentation with lactic acid bacteria progresses, whereby the fermented fish-meat food is obtained which has taste and flavor specific to the fermentation with lactic acid bacteria and has a texture similar to that of animal meat. Thus, fermented seafood having a novel texture that has not been experienced so far can be obtained.

And the texture of fish meat treated with salt tend to become hard, though fermentation with lactic acid bacteria makes the processed seafood product softer and juicier.

EXAMPLES

The present invention will be described below in detail in connection with Examples. It is to be noted that the present invention is not restricted by the following Examples.

Example 1

After adding 100 g of tuna oil (made by Nippon Suisan K.K.), 10 g of salt and 10 g of glucose to 1 kg of minced meat of frozen hoki, which was cut into small pieces by a food cutter, and mixing them sufficiently, strains of *Lactobacillus* sake D-1001 were added to a mixture such that the number of strains amounted to $10^7$/g. Then, each 100 g of the thus-prepared meat was cased in a cellulose tube. After the casing, the meat was fermented at 5° C. for seven days, followed by drying at 15° C. for another seven days with an artificial weather machine made by Hitachi K.K. As a result, fermented seafood sausage was obtained.

Example 2

(Comparative)

After adding 100 g of tuna oil (made by Nippon Suisan K.K.), 10 g of salt and 10 g of glucose to 1 kg of minced meat of hoki, which was cut into small pieces by a food cutter, and mixing them sufficiently, strains of *Lactobacillus plantarum* JCM1149 were added to a mixture such that the number of strains amounted to $10^7$/g. Then, each 100 g of the thus-prepared meat was cased in a cellulose tube. After the casing, the meat was fermented at 5° C. for seven days, followed by drying at 15° C. for another seven days with an artificial weather machine made by Hitachi K.K. As a result, fermented seafood sausage was obtained.

Table 1 shows results of measuring the pH value and the number of lactic acid bacteria in various stages of preparing and producing the fermented seafood in each of Examples 1 and 2. Also, the fermented seafood obtained in each of Examples 1 and 2 was evaluated with a sensory-test panel comprising well-skilled 15 persons based on such a scoring method that the sample of Example 1 was rated from –4 to +4 with respect to the sample of Example 2 rated 0.

TABLE 1

| | Example 2 (Comparative) | | Example 1 | |
|---|---|---|---|---|
| days | pH | lactobacillus (number/g) | pH | lactobacillus (number/g) |
| 0 | 6.3 | $4.1 \times 10^6$ | 6.2 | $4.1 \times 10^6$ |
| 7 | 4.9 | $1.9 \times 10^8$ | 5.6 | $6.7 \times 10^7$ |
| 14 | 4.6 | $3.2 \times 10^8$ | 4.8 | $1.8 \times 10^8$ |

As seen from Table 1, in both of Example 1 in which the seafood was fermented using strains of *Lactobacillus* sake D-1001 and Example 2 in which the seafood was fermented using strains of *Lactobacillus plantarum* JCM1149, sufficient growth of the lactic acid bacteria was confirmed. Also, the pH value was lowered faster in Example 2 in which strains of *Lactobacillus plantarum* JCM1149 having a higher acid producing power were used.

TABLE 2

| Evaluation item | Example 2 (Comparative) | Example 1 |
|---|---|---|
| Intensity of acidic flavor | 0 | –1.5 |
| Intensity of sourness | 0 | –2.0 |
| Intensity of salty taste | 0 | 0 |
| Intensity of body | 0 | 1.2 |
| Thickness of taste | 0 | 1.2 |

As seen from Table 2, the seafood obtained in Example 1 had weaker acidic flavor and sourness than that obtained in Example 2. This result is presumably attributable to the fact that the strains of *Lactobacillus* sake D-1001 used in Example 1 have a lower acid producing power than the strains of *Lactobacillus plantarum* JCM1149 used in Example 2, as seen from Table 1, and hence provide weaker acidic flavor and sourness. Further, the seafood obtained in Example 1 had thicker taste and deeper body as a whole. According to free opinions of the panelists regarding odor, stuffy odor was perceived with the seafood obtained in Example 2, but no stuffy odor was perceived with the seafood obtained in Example 1. Additionally, regarding a texture, the panelists commented that a texture more similar to that of animal meat was perceived with the seafood obtained in Example 1 than that obtained in Example 2.

Example 3

After adding 100 g of tuna oil (made by Nippon Suisan K.K.), 10 g of salt and 10 g of glucose to 1 kg of minced meat of frozen salmon and tuna, which was cut into small pieces by a food cutter, and mixing them sufficiently, strains of *Lactobacillus* sake D-1001 were added to a mixture such that the number of strains amounted to $10^7$/g. Then, each 100 g of the thus-prepared meat was cased in a cellulose tube. After the casing, the meat was fermented at 5° C. for seven days, followed by drying at 15° C. for 3 to 15 days with an artificial weather machine made by Hitachi K.K., whereby fermented seafood sausage was obtained. As a result, fermented seafood sausage having a different texture depending on the degree of drying can be obtained.

Example 4

After thawing each 1 kg of minced meat of frozen salmon and tuna, a pickle solution was prepared by mixing 30 g of vegetable protein (made by Fuji Protein K.K.), 20 g of dried albumen, 20 g of salt, 5 g of fermented seasoning TN (made by Nippon Suisan K.K.), 40 g of trehalose, and 300 g of water. Then, 75 g of strains of *Lactobacillus* sake D-1001 in number amounted to $10^7$/g were added to and mixed in the pickle solution. Subsequently, the thus-prepared solution was injected to the salmon and the tuna using a syringe. After casing the thus-prepared fish meat in a cellulose tube, the meat was fermented at 5° C. for seven days. Then, the meat was subjected to maturing (60° C., 20 minutes), drying (65° C., 20 minutes), smoking (70° C., 20 minutes), and cooking (80° C., 20 minutes) in a smokehouse, followed by drying at 15° C. for 2 hours with an artificial weather machine made by Hitachi K.K. As a result, fermented ham was obtained which had taste and flavor specific to the start materials and also had a juicy feeling when eaten. Further, the fermented ham obtained by using frozen salmon as start materials was measured for POV and COV representing degrees of oil oxidation. From the measured results shown in Table 3 given below, it was found that oxidation of the fermented ham obtained by lactic fermentation using the lactic acid bacteria was suppressed in comparison with a ham obtained without adding any lactic acid bacteria.

TABLE 3

|  | POV Meq/kg | COV Meq/kg |
| --- | --- | --- |
| Product fermented with *lactobacillus* | 2.8 | 15.4 |
| Control (product with no *lactobacillus* added) | 12.5 | 43.4 |

Example 5

After thawing each 1 kg of minced meat of frozen salmon and tuna, a pickle solution was prepared by mixing 30 g of vegetable protein (made by Fuji Protein K.K.), 20 g of dried albumen, 20 g of salt, 5 g of fermentation seasoning TN (made by Nippon Suisan K.K.), 40 g of trehalose, and 300 g of water. Then, 75 g of strains of *Lactobacillus* sake D-1001 in number amounted to $10^7$/g were added to and mixed in the pickle solution. Subsequently, the salmon and the tuna was tumbled with the thus-prepared solution. After casing the thus-prepared fish meat in a fibrecasing tube, the meat was fermented at 10° C. for three days. Then, the meat was subjected to maturing (60° C., 20 minutes), drying (65° C., 20 minutes), smoking (70° C., 20 minutes), and cooking (80° C., 20 minutes) in a smokehouse, followed by drying at 15° C. for 1 day with an artificial weather machine made by Hitachi K.K. As a result, fermented ham was obtained which had taste and flavor specific to the start materials and also had a soft feeling when eaten. Further, the fermented ham obtained was drying at 15° C. for three days with an artificial weather machine made by Hitachi K.K., then the texture of the fermented ham became firmer.

Example 6

Frozen salmon filleted into two pieces was soaked in the 6% salt solution inoculated with *Lactobacillus* sake D-1001 for two nights. After desalted with running water, the salmon was steam boiled for 15 minutes, then the salmon was quick-cooled and flaked into small pieces. As a control, the 6% salt solution without *Lactobacillus* sake D-1001 was used. A sensory-test was carried out as the same method with Table 2. As seen from Table 4, the fermented meat flakes are softer and juicier.

TABLE 4

|  | Control | Example 6 |
| --- | --- | --- |
| Softness of meat | 0 | 1.5 |
| Juiciness of meat | 0 | 2.0 |

As fully described above, according to the present invention, fermented seafood is produced through the steps of acting, upon fish and shellfish, a lactic acid bacteria having salt tolerance and an antibacterial property and being able to grow at low temperature, fermenting the fish and shellfish with the lactic acid bacteria, and smoking and then drying the fermented fish and shellfish. The thus-produced fermented seafood is a processed seafood product that has suppressed sourness, a texture similar to that of animal meat, and a good flavor. And the texture of fish meat treated with salt, like a salt-sprinkled fish or a salt-soaked fish, tend to become hard, though fermentation with lactic acid bacteria makes the processed seafood product softer and juicier.

What is claimed is:

1. A method for producing a processed fish meat of Salmonidae family which is protected from oxidation, wherein a lactic acid bacteria fermenting at temperature not higher than 10° C. and having salt tolerant, antibacterial, and antioxidative properties is used in the step of fermenting fish meat of Salmonidae family with lactic acid bacteria.

2. A method for producing a processed fish meat of Salmonidae family according to claim 1, wherein the lactic acid bacteria fermenting at temperature not higher than 10° C. and having salt tolerant, antibacterial, and antioxidative properties is a lactic acid bacteria belonging to one genus selected from a group consisting of *Leuconostoc* genus, *Lactobacillus* genus, *Lactococcus* genus, and *Pediococcus* genus.

3. A method for producing a processed fish meat of Salmonidae family according to claim 1, wherein the lactic acid bacteria fermenting at temperature not higher than 10° C. and having salt tolerant, antibacterial, and antioxidative properties is a lactic acid bacteria belonging to *Lactobacillus sake*.

4. A method for producing a processed fish meat of Salmonidae family according to claim 1, wherein the lactic acid bacteria fermenting at temperature not higher than 10° C. and having salt tolerant, antibacterial, and antioxidative properties is *Lactobacillus sake* D-1001 (No. 11708 deposition to International Patent Organism Depositary).

5. A method for producing a processed fish meat of Salmonidae family according to claim 1, comprising the steps of fermenting fish meat at temperature not higher than 10° C., followed by smoking and drying the fermented fish meat.

6. A method for producing a processed fish meat of Salmonidae family according to claim 1 further comprising the process of treatment fish meat with salt before, simultaneously, or after the fermentation.

7. A method for producing a processed fish meat of Salmonidae family according to claim 1 further comprising the cooking process of the fermented fish meat after the fermentation.

8. A method for producing a processed fish meat of Salmonidae family according to claim 1, wherein fish meat or minced thereof are used as a raw material.

9. A processed fish meat of Salmonidae family produced by the method according to claim 1.

* * * * *